US008127311B2

(12) United States Patent
Eryilmaz (10) Patent No.: US 8,127,311 B2
(45) Date of Patent: Feb. 28, 2012

(54) ABSTRACT INTERFACE FOR UNIFIED COMMUNICATIONS WITH DYNAMIC MODELS

(75) Inventor: Bora Eryilmaz, Boston, MA (US)

(73) Assignee: The MathWorks, Inc., Natick, MA (US)

(*) Notice: Subject to any disclaimer, the term of this patent is extended or adjusted under 35 U.S.C. 154(b) by 1225 days.

(21) Appl. No.: 11/270,221

(22) Filed: Nov. 9, 2005

(65) Prior Publication Data

US 2007/0106489 A1 May 10, 2007

(51) Int. Cl.
*G06F 9/46* (2006.01)
*G06F 17/50* (2006.01)
(52) U.S. Cl. ............... 719/328; 703/13; 716/100
(58) Field of Classification Search ............ 703/14, 703/21, 13; 716/5, 6, 100; 719/328
See application file for complete search history.

(56) References Cited

U.S. PATENT DOCUMENTS

| 6,289,502 | B1* | 9/2001 | Garland et al. ............ 717/104 |
| 7,366,651 | B1* | 4/2008 | Milne et al. ............... 703/27 |
| 7,483,825 | B2 | 1/2009 | Van Huben et al. |
| 7,490,029 | B2* | 2/2009 | Wasynczuk et al. ......... 703/17 |
| 7,546,571 | B2 | 6/2009 | Mankin et al. |
| 7,571,395 | B1 | 8/2009 | Seng et al. |
| 2003/0016234 | A1 | 1/2003 | Mani et al. |
| 2003/0100972 | A1 | 5/2003 | Andersh et al. |
| 2003/0125913 | A1* | 7/2003 | Du ........................... 703/2 |
| 2003/0204386 | A1 | 10/2003 | Colon-Bonet et al. |
| 2005/0188334 | A1* | 8/2005 | Shah et al. .................. 716/1 |
| 2005/0251766 | A1 | 11/2005 | Shah et al. |
| 2006/0053211 | A1* | 3/2006 | Kornerup et al. ........... 709/217 |
| 2007/0005324 | A1* | 1/2007 | Gong et al. ................. 703/14 |

OTHER PUBLICATIONS

Dirckze, Ravi et al., "Java™ Metadata Interface (JMI) Specification," retrieved online at http://jcp.org/aboutJava/communityprocess/final/jsr040/index.html (2005).
Flanagan, David, "JAVA in a Nutshell," 2nd Edition, O'Reilly & Associates, Inc., Paula Ferguson Editor, pp. 75-81 (1997).
Kath, O. et al., "An Open Modeling Infrastructure integrating EDOC and CCM," *Proceedings Seventh IEEE International Enterprise Distributed Object Computing Conference*, pp. 198-207 (2003).
Müller-Glaser, Klaus D. et al., "Heterogeneous Modeling for Automotive Electronic Control Units using a CASE-Tool Integration Platform," *2004 IEEE International Symposium on Computer Aided Control Systems Design*, pp. 83-88 (2004).
International Search Report for Application No. PCT/US2006/043531, dated Jun. 19, 2007.
European Office Action for Application No. 06837182.2, dated Aug. 25, 2009.

* cited by examiner

*Primary Examiner* — Charles E Anya
(74) *Attorney, Agent, or Firm* — Nelson Mullins Riley & Scarborough LLP (57) ABSTRACT

The present invention provides a method and system for interfacing with a model regardless of model type. An abstract interface is provided for interfacing a model. The abstract interface is compatible with a plurality of model types. A call can then be made to a dynamic model via a method specified by the abstract interface. Data is then received from the dynamic model in response to the call. In certain embodiments the abstract interface is an application programming interface (API).

31 Claims, 5 Drawing Sheets

ABSTRACT INTERFACE FOR UNIFIED COMMUNICATIONS WITH DYNAMIC MODELS

FIELD OF THE INVENTION

The present invention relates to modeling environments for dynamic systems. More particularly, the present invention relates to interfacing with models regardless of model type.

BACKGROUND OF THE INVENTION

Many organizations are embracing the paradigm of Model Based Development in their production processes. "Model Based Development" refers to the practice of specifying, analyzing, and implementing systems using a common "model" containing a set of block diagrams and associated objects. System implementation typically involves automatically generating code for portions of the model, particularly portions corresponding to the system's control algorithm.

Graphical modeling environments are an example of software applications that may enable a user to model dynamic systems i.e., systems whose outputs change over time, using a graphical model, such as a block diagram. Some graphical modeling environments also enable simulation and analysis of models. Simulating a dynamic system in a graphical modeling environment is typically a two-step process. First, a user creates a graphical model, such as a block diagram, of the system to be simulated. A graphical model may be created using a graphical user interface, such as a graphical model editor. The graphical model depicts time-based relationships between the systems inputs, states, parameters and outputs. After creation of the graphical model, the behavior of the dynamic system over a specified time period is simulated using the information entered into the graphical model. In this step, the graphical model is used to compute and trace the temporal evolution of the dynamic systems' outputs ("execute the graphical model"), and automatically produce either deployable software systems or descriptions of hardware systems that mimic the behavior of either the entire model or portions of the model (code generation).

Dynamic systems may also be modeled textually. In this methodology, dynamic systems are described in an application specific language or code. Using this textual description, the dynamic system may be simulated and analyzed. Simulating a dynamic system in a textual modeling environment is typically a two-step process. First, a user creates a textual model, such as an M-file or LTI model, of the system to be simulated. A textual model may be created using a textual user interface, such as a textual model editor. The textual model depicts time-based relationships between the systems inputs, states, parameters and outputs. After creation of the textual model, the behavior of the dynamic system over a specified time period is simulated using the information entered into the textual model. In this step, the textual model is used to compute and trace the temporal evolution of the dynamic systems' outputs ("execute the graphical model"), and automatically produce either deployable software systems or descriptions of hardware systems that mimic the behavior of either the entire model or portions of the model (code generation).

There are many different techniques for modeling systems using different modeling environments. One problem with this is that a model created in one modeling environment may not be compatible with another modeling environment. As such, toolboxes possessing tools and functions of interest for use with a model may not be compatible with the modeling environment the model was created in. Thus what is need is a simple convenient way of interfacing a model regardless of model type.

SUMMARY OF THE INVENTION

The present invention provides a method and system for interfacing with a model, regardless of model type.

In accordance with a first aspect, a method is provided for use in a modeling environment. The method involves providing an abstract interface for interfacing a model. The abstract interface is compatible with a plurality of model types. Then a call is made to a dynamic model via a method specified in a concrete implementation of the abstract interface. Data is then received from the dynamic model in response to the call.

In accordance with another aspect, a medium is proved for use with a computing device. The medium holds instructions executable by the computing device for performing a method. The method involves providing an abstract interface for interfacing a model, wherein the abstract interface is compatible with a plurality of model types; making a call to a dynamic model via a method specified in the abstract interface; and receiving data from the dynamic model in response to the call.

In accordance with another aspect, a system is provided for executing a modeling application. The system involves user-operable input means for inputting data to the physical modeling application; a display device for displaying a physical model; and a computing device including memory for storing computer program instructions and data, and at least one processor for executing the stored computer program instructions. The computer program instructions include instructions for providing an abstract interface for interfacing a model, the abstract interface being compatible with a plurality of model types; making a call to a dynamic model via a method specified in the abstract interface; and receiving data from the dynamic model in response to the call.

In accordance with another aspect, a system is provided for executing a modeling application. The system includes a distribution server for providing to a client device, an abstract interface for interfacing a model, the abstract interface being compatible with a plurality of model types; and a client device in communication with the distribution server. The client device can make a call to the dynamic model in the distribution server via a method specified in the abstract interface and receive data from the dynamic model in response to the call.

In accordance with another aspect, a method is proved for network having a server, executing a physical modeling environment, and a client device in communication with the server. The method involves the steps of: providing, at the server, a dynamic model of a system; providing an abstract interface for interfacing a model, the abstract interface being compatible with a plurality of model types; receiving, at the server from the client device, a call to a dynamic model via a method specified in the abstract interface; and receiving data from the dynamic model in response to the call.

DETAILED DESCRIPTION OF AN ILLUSTRATIVE EMBODIMENT

An illustrative embodiment of the present invention is directed to creating a universal object class representation of a model which can be interfaced by a number of modeling environments. The present invention will be described relative to illustrative embodiments. Those skilled in the art will appreciate that the present invention may be implemented in a number of different applications and embodiments and is not specifically limited in its application to the particular embodiments depicted herein.

Figure 1:
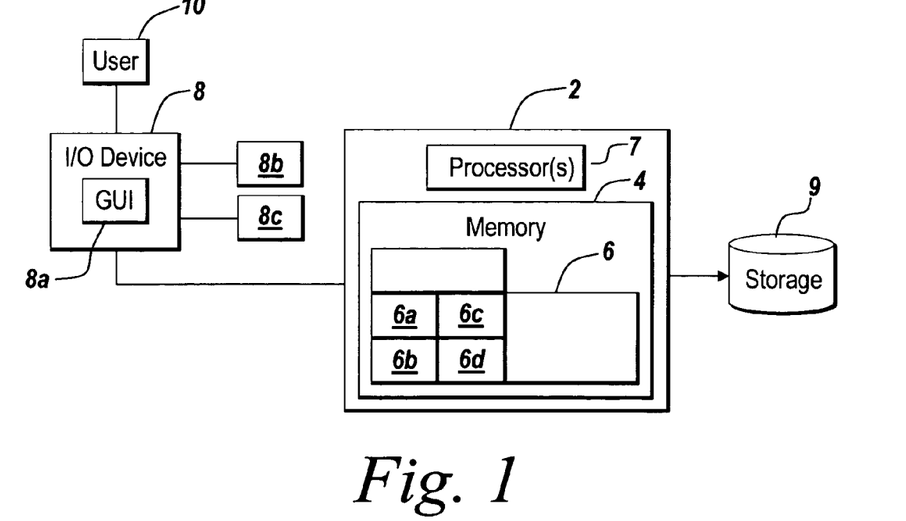
FIG. 1 illustrates an environment suitable for practicing an illustrative embodiment of the present invention.

FIG. 1 depicts an environment suitable for practicing an illustrative embodiment of the present invention. A computing device 2 includes memory 4, on which software according to one embodiment of the present invention is stored, one or more processors (CPU) 7 for executing software stored in the memory, and other programs for controlling system hardware. Such processors can have one or more cores allowing for multiple instances of software to run simultaneously on the processor. The use of multiple processors, multiple cores, or both allow for greater computational functionality as multiple applications or processes can be run concurrently on the computing device.

Typically, the interaction of a human user with the computing device 2 occurs through an input/output (I/O) device 8, such as a graphical user interface (GUI). The I/O device 8 may include a display device 8a (such as a monitor) and an input device (such as a mouse 8b and a keyboard 8c and other suitable conventional I/O peripherals.

For example, the memory 4 holds a modeling application 6 capable of creating and simulating digital versions of system models, such as block diagrams, state diagrams, signal diagrams, flow chart diagrams, sequence diagrams, UML diagrams, dataflow diagrams, circuit diagrams, ladder logic diagrams, kinematic element diagrams, or other models, which may be displayed to a user 10 via the display device 8a. In the illustrative embodiment, the modeling application 6 comprises a MATLAB modeling environment, such as Simulink® or another suitable modeling environment. As used herein, the terms "modeling environment" and "physical modeling environment" refer to an application where a model, such as a model of a physical system, is created and translated into executable instructions. Examples of suitable modeling applications include, but are not limited to MATLAB, including Simulink, SimMechanics, and SimDriveline from the MathWorks, Inc.; LabVIEW, DasyLab and DiaDem from National Instruments Corporation, VEE from Agilent, SoftWIRE from Measurement Computing, VisSim from Visual Solutions, SystemVIEW from Elanix, WiT from Coreco, Vision Program Manager from PPT Vision, Khoros from Khoral Research, and numerous others. The memory 4 may comprise any suitable installation medium, e.g., a CD-ROM, floppy disks, or tape device; a computer system memory or random access memory such as DRAM, SRAM, EDO RAM, Rambus RAM, etc.; or a non-volatile memory such as a magnetic media, e.g., a hard drive, or optical storage. The memory may comprise other types of memory as well, or combinations thereof.

In an alternate embodiment, the computing device 2 is also interfaced with a network, such as the Internet. Those skilled in the art will recognize that the diagrams used by the diagramming application 6 may be stored either locally on the computing device 2 or at a remote location 9 interfaced with the computing device over a network. Similarly, the diagramming application 6 may be stored on a networked server or a remote peer.

The modeling application 6 of an illustrative embodiment of the invention includes a number of generic components. Although the discussion contained herein focuses on MATLAB from The MathWorks, Inc. of, Natick Mass., those skilled in the art will recognize that the invention is applicable to other software applications. The generic components of the illustrative diagramming program 6 include a model editor 6a for specifying models of dynamic systems. The model editor 6a allows users to perform such actions as construct, edit, display, annotate, save, and print out a model that represents a physical system. The illustrative diagramming application 6 also includes elements libraries 6b that contain elements that may be combined to model systems. There may also be a graphical aspect 6c that allows graphical modeling. An execution engine 6d, also implemented in the application, is used to process a model to produce simulation results or to convert the model to executable code. The execution engine 6d translates a model to executable entities. The executable entities are compiled and executed on a computational device, such as a computer, to implement the functionality specified by the model. Typically, the code generation preserves a model hierarchy in a call graph of the generated code. For instance, each subsystem of a model in a physical modeling environment can map to a user specified function and the generated code. Real-Time Workshop from the MathWorks, Inc. of Natick, Massachusetts is an example of a suitable execution engine 6d for generating code.

In the illustrative embodiment, the modeling program 6 is implemented as a companion program to a technical computing program, such as MATLAB, also available from the MathWorks, Inc.

The model editor 6a is the component that allows a user to create and modify a model representing a physical system. The model editor 6a also allows a user to create and store data relating to model element 6b. A textual interface with a set of commands allows interaction with the model editor. Using this textual interface, users may write special scripts that perform automatic editing operations on the model. A user generally interacts with a set of windows that act as canvases for the model. There is generally more than one window for a model because models may be partitioned into multiple hierarchical levels through the use of subsystems.

Once a model has been constructed using the editor 6a, the execution engine 6d simulates the model by solving equations defined by the model to trace the system outputs as a function of time. The solution of the model, which may be referred to as model execution, is carried out over a user-specified time span for a set of user-specified inputs.

Figure 2:
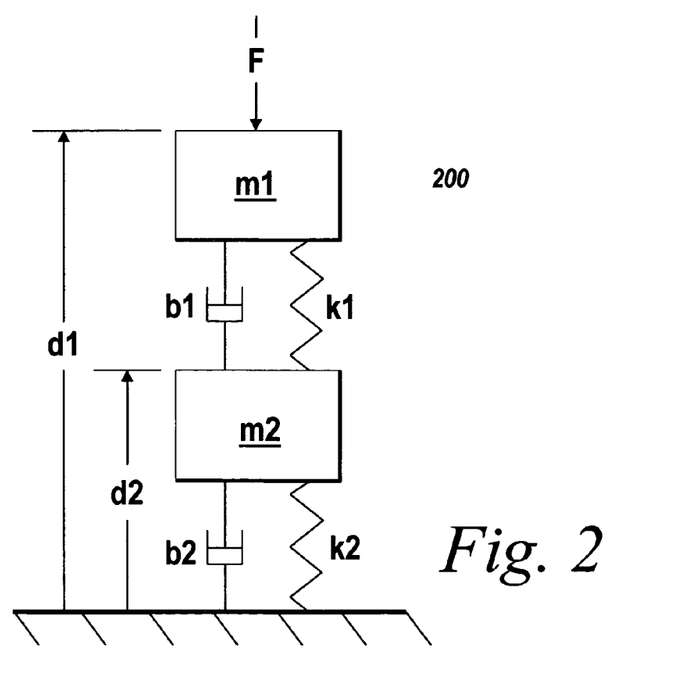
FIG. 2 is an exemplary Mass-Spring-Damper system to be modeled.

FIG. 2 is a depiction of a Mass-Spring-Damper system 200 to be modeled using a modeling environment. The equations of motion for this system can be written as $$\dot{x} = \begin{bmatrix} d1 \\ d1 \\ d2 \\ d2 \end{bmatrix}$$

$$= \begin{bmatrix} 0 & 1 & 0 & 0 \\ -\frac{k1}{m1} & -\frac{b1}{m1} & \frac{k1}{m1} & \frac{b1}{m1} \\ 0 & 0 & 0 & 1 \\ \frac{k1}{m2} & \frac{b1}{m2} & -\frac{k1+k2}{m2} & -\frac{b1+b2}{m2} \end{bmatrix} x + \begin{bmatrix} 0 \\ -\frac{1}{m1} \\ 0 \\ 0 \end{bmatrix} F$$

$$y = \begin{bmatrix} 1 & 0 & 0 & 0 \\ 0 & 0 & 1 & 0 \end{bmatrix} x + [0] F$$

The default parameter values are m=[1,2]kg, k=[100,200]N/m, and b=[10, 20]Ns/m.

Figure 3:
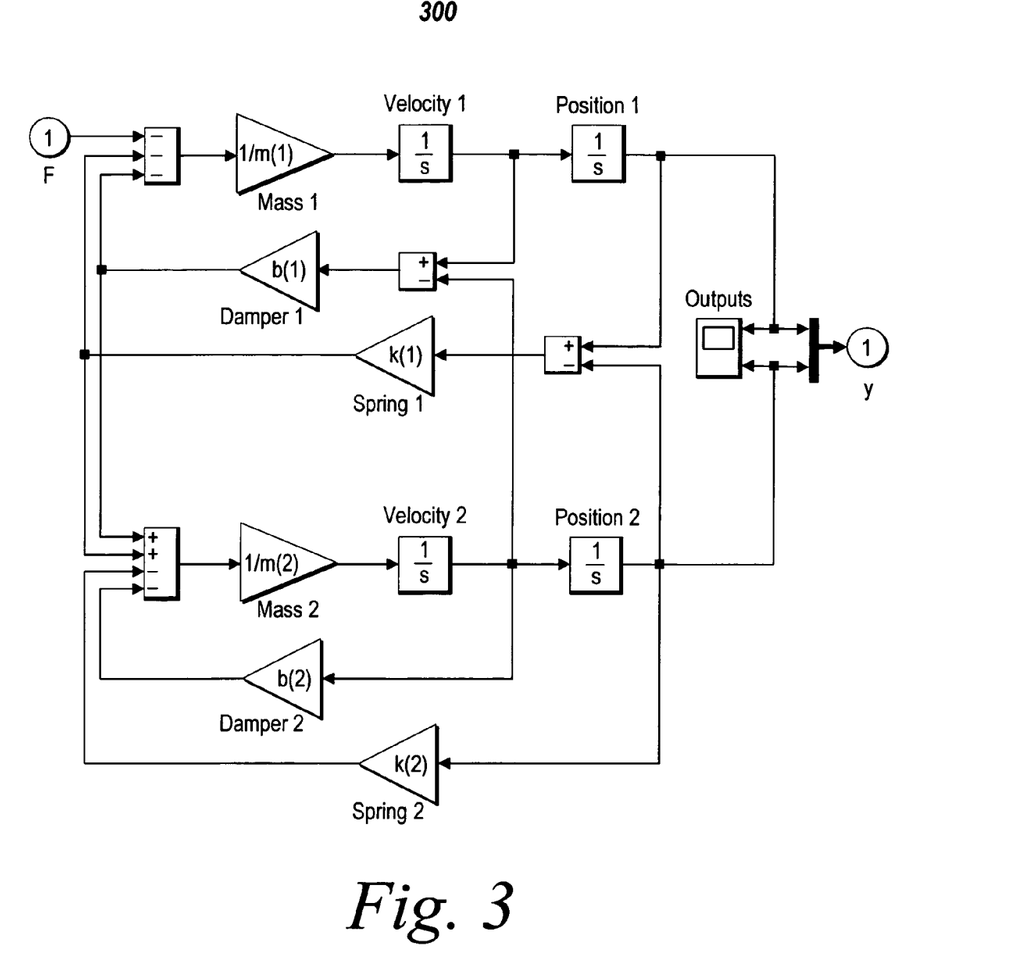
FIG. 3 is an exemplary graphical model of the Mass-Spring-Damper system of FIG. 2.

These model equations can be implemented in an M-file to be solved. Such an M-file may contain code as shown below.

function [dx,y]=mds_model_ode (t,x,u,p1,p2,p3)
% M-file ODE model of the mass-spring-damper system.
%
% dx: Output equations
% y: State equations
%
% t: Current time
% x: State vector at time t
% u: Input vector at time t
% p1, . . . , pn: Model parameters
m=p1; k=p2; b=p3;
A=[0, 1, 0, 0;
 −k(1)/m(1), −b(1)/m(1), k(1)/m(1), b(1)/m(1);
 0, 0, 0, 1;
 k(1)/m(2), b(1)/m(2), −(k(1)+k(2))/m(2), −(b(1)+b(2))/m(2)];
B=[0; −1/m(1); 0; 0];
C=[1 0 0 0; 0 0 1 0];
D=0;
dx=A*x+B*u;
y=C*x+D*u;

The Mass-Spring-Damper system of FIG. 2 can also be modeled in a graphical modeling environment such as Simulink. An example of such a system can be seen in the block diagram 300 of FIG. 3.

Alternatively to the M-file or Simulink models, the system of FIG. 2 can be modeled as linear time-invariant (LTI) object. Such a LTI object can be created using the following commands:

Function G = msd_model_lti( )
% LTI model of the mass-spring-damper system.
m = [1 2]; k = [100 200]; b = [10 20];
A = [0, 1, 0, 0;
 −k(1)/m(1), −b(1)/m(1), k(1)/m(1), b(1)/m(1);
 0, 0, 0, 1;
 k(1)/m(2), b(1)/m(2), −(k(1)+k(2))/m(2), −(b(1)+b(2))/m(2)];
B = [0; −1/m(1); 0; 0];
C = [1 0 0 0; 0 0 1 0];
D = 0;
G = ss(A, B, C, D);
set (G, 'InputName',   'F', . . .
    'OutputName'  {'d1' 'd2'}, . . .
    'StateName',  {'Position 1', 'Velocity 1', 'Position 2', 'Velocity 2'})

As can be seen from the above examples, there are several ways to model a system. One of the problems with there being multiple techniques is that they are not necessarily compatible. As such, toolboxes possessing tools and functions of interest may be compatible with one model but not another. For example, Simulink Parameter Estimation (SPE), Simulink Response Optimization (SRO), and Simulation Control Design (SCD) toolboxes can only be used with Simulink models. Likewise the Control System Toolbox (CST) can only be used with LTI models. This presents a problem, in that it may be desirable to use the features of a toolbox on a model the toolbox is not compatible with. Ideally, it would be advantageous to be able to interface a model, such as from a toolbox, regardless of how the model was created.

Figure 4:
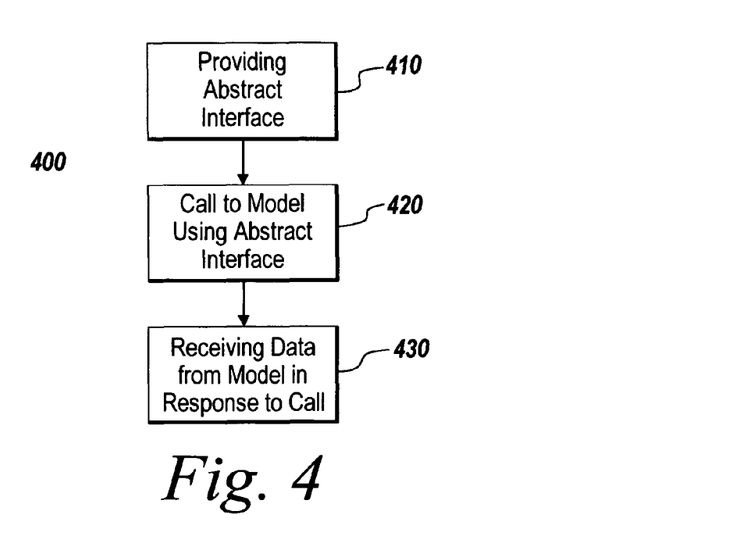
FIG. 4 is an exemplary flowchart of a method of interfacing a model of a dynamic system using an abstract interface.

FIG. 4 depicts a flow chart 400 of one embodiment of interfacing a model in a modeling environment regardless of model type. The first step is providing an abstract interface for interfacing a model wherein the abstract interface is compatible with a plurality of model types 410. Next, a call is made to a dynamic model using functions or methods specified in the abstract interface 420 and supported by the underlying dynamic model. Data is then received from the dynamic model in response to the call 430. Each of these steps will be discussed in more detail below.

Figure 5:
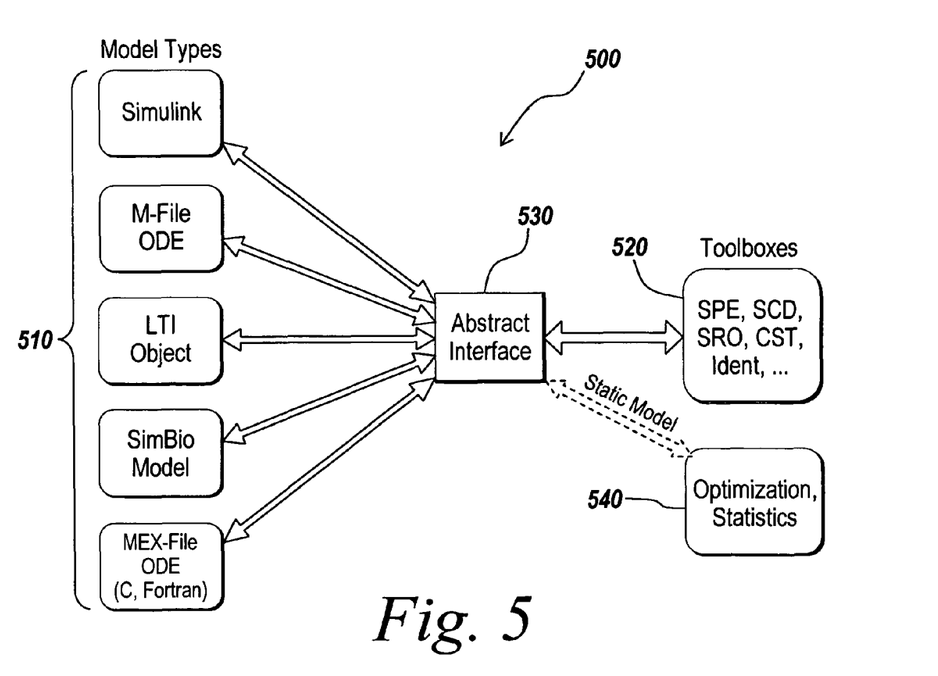
FIG. 5 is an example diagram of how the abstract interface provides communication between models and toolboxes.

The abstract interface allows for a model to be interfaced regardless of how it was generated. For each model type the implementation for the functions that interface with the toolbox are provided. As such, a toolbox or modeling environment can access any type of model. An example of this can be seen in the diagram 500 of FIG. 5. As depicted in this diagram 500, various model types 510 can be interface with a toolbox 520 using the abstract interface 530. In certain instances, a static model can also be interface for optimization and statistical analysis 540.

In certain embodiments, the abstract interface is an application programming interface (API). An API is a set of definitions of the ways one piece of computer software communicates with another. The API provides a set of routines, protocols, and tools for allowing communication between the software applications, for example the model and toolbox. Using these routines, protocols and tools the toolbox or modeling environment can interface with the model.

In one embodiment, the abstract interface is implemented using a model object class. The model class defines an interface for communicating with various types of models that can be created in MATLAB, including Simulink models, SimBiology models, and ODEs defined in M-functions. Toolboxes can communicate with the models through the model class interface, allowing the implementation of other model types.

The model class defines the properties for objects representing models. For example the class can define properties that are common for representations of all model types. These include field details, constructor details, and method details.

Field details include the version of the model. Other field details may be provided as necessary for specific models. Other suitable field details will be apparent to one skilled in the art given the benefit of this disclosure.

Constructor details set forth the call made by the abstract interface to create a model object. Examples of constructor details will be given below in reference to specific model types. Other suitable constructor details will be apparent to one skilled in the art given the benefit of this disclosure.

Method details include the methods functions and calls that are to be supported by an instantiated model object. A list of example methods that are to be implemented for all model types can be seen below:

getName: Returns the name of the model.
    name = m.getName;
getInputs/findInput: Used to extract input port information from the model.
    hIn = m. getInputs;                                  % All inputs
    hIn = m. getInputs([2 3]);                     % Multiple inputs by indices
    hIn = m.findInput('u') ;                       % One input by name
getOuputs/findOutputs: Used to extract output port information from the model.
    hOut = m.getOutputs;                            % All outputs
    hOut = m.getOutputs([1 2]);                 % Multiple outputs by indices
    hOut = m.findOutput('subsystem1/Out1') ;  % One output by name
getParameters/findParameter: Used to extract parameter information from the model.
    hPar = m.getParameters;                     % All parameters
    hPar = m.getParameters([2 4 7]);       % Multiple parameters by indices
    hPar = m.findParameter('Ka') ;          % One parameter by name
    hPar = m. findParameter('reaction: K1') ;  % One parameter by name
getStates/findState: Used to extract state information from the model.
    hIc = m.getStates;                             % All states
    hIc = m.getStates([1 3 5]);                % Multiple states by indices
    hIc = m.findState('sensor/x1');           % One state by name
getValue: Used to get the current parameter and/or initial state values in the model.
    sVal = m.getValue('Actuator Model');     % Get state value object by name
    % Equivalent to:
    sId = m.findState('Actuator Model');
    sVal= m.getValue(sId);
    pId = m.getParameters;
    sId = m.getStates([2 4]);
    pVal = m. getValue (pId) ;                % Get parameter value objects
    hVal = m.getValue([pId; sId]);           % Get parameter/state value objects
setValue: Used to set the parameter and/or initial state values in the model.
    m.setValue('Actuator Model', 2.5);       % Set state value by name
    % Equivalent to:
    sId = m.findState('Actuator Model');
    m.setValue(sId, 2.5);
    hVal = m.getValue(sId);
    hVal.Value = 2.5;
    m. setValue (hVal) ;                       % Set using value objects
    pId = m.getParameters(2);
    sId = m.getStates([2 4]);
    m.setValue(pId, 1.0);                   % Set parameter value
    m.setValue([pId; sId], {1.0, 0.05, 0.0});  % Set parameter/state values
addOutput: Adds one or more outputs to the model.
    hOut = m. addOutput('u') ;               % One output by name
    hOut = m.addOutput(hPorts) ;           % From specified port objects
removeOutput: Removes one or more outputs from the model.
    m.removeOutput('Nz Pilot');             % One output by name
    % Equivalent to:
    hOut = m.find0utput('NZ Pilot');
    m.removeOutput(hOut);
    m.remove Out put;                         % All outputs
    m.removeOutput (hPorts);                % Specified output ports
    m.removeOutput ([1 2]);                 % Multiple outputs by indices
getLinearizationIOs/findLinearizationIO: Used to extract linearization I/O port information from the model.
    hLin = m.getLinearizationIOs;          %All linearization ports
    hLin = m.getLinearizationIOs([1 2]);    % Multiple lin. ports by indices
    hLin = m.findLinearizationIO('subsys/In1');  % One linearization port by name
addLinearizationIO: Adds one or more linearization I/Os to the model.
    hLin = m. addLinearizationIO (hPorts) ;   % From specified lin. port objects
    hLin = m.addLinearizationIO('u');       % One linearization port by name
removeLinearizationIO: Removes one or more linearization I/Os from the model,
    m.removeLinearizationIO;               % All linearization ports
    m. removeLinearizationIO(hPorts) ;      % Specified linearization ports
    m.removeLinearizationIO([1 2]);        % Multiple lin. ports by indices
    m.removeLinearizationIO('Nz Pilot');    % One linearization port by name
getCurrentConfig: Returns the current model configuration object (set).
    config = m.getCurrentConfig;
setCurrentConfig: Sets the current model configuration object (set).
    m.setCurrentConfig(config);
simulate: Returns the time response of the system for the (optionally) specified outputs.
    [outputs, info] = m.simulate(timespan, inputs, options);
getSensitivity: Gets the sensitivity derivatives of the system for the (optionally) specified outputs with respect to a given parameter or initial state.
    [derivs, info] = m.getSensitivity(timespan, inputs, variable, options);
    [lResp, rResp, info] = m.getSensitivity(timespan, inputs, variable, options);
findOperatingPoint: Finds the operating point (steady-state) of the model from operating point specifications or by simulation at the given times.
    [op_point, op_report] = m.findOperatingPoint(op_spec, linoptions);
    op_points = m.findOperatingPoint(snapshottimes, linoptions);
linearize: Linearize the model at the given operating point for (if) specified linearization I/O ports.
    G = m.linearize(op.point, linearizationios, linoptions);

```
       G = m.linearize(snapshottimes, linearizationios, linoptions);
update: Synchronizes the concrete Model object when the underlying model changes.
       m.update;
```

The model class can also be extended for specific model types. For example, the model class may be extended to a MLModel class. The MLModel class defines a concrete interface for communication with models defined in either M-Files or Mex-files. Mex-files are used to implement model equation in compiled code such as Fortran or C. The MLModel class has all the properties of the model class plus some additional properties set forth below.

Field Details

ModelFcn: Function handle to the M-file or MEX-file representing the model.

IOPorts: Object array of type MLPortID containing information about the I/Os of the model.

LinearizationPorts: Object array of type MLLinearizationPortID containing information about the linearization I/Os of the model.

Parameters: Object array of type MLParameterID containing information about the parametersof the model.

States: Object array of type MLStateID containing information about the states of the model.

ParameterValues: Object array of type ParameterValue storing current parameter values.

InitialState: Object array of type StateValue storing initial state values.

ConfigSet: Object containing various simulation settings for the model.

the state identifier class (StateID). Each of these share the common properties of the Variable ID class plus additional properties.

The port identifier class (PortID) is an abstract class that defines an interface for objects representing the concept of inputs and outputs of a model. The inputs are the points where signals are injected into a model; and the outputs are the points where signals of interest are measured and logged. These also include signals marked as linearization I/Os. The classes derived from the PortID class need to implement the operations defined by the interface and are used by the Model objects to identify their inputs and outputs to interested client objects. In the context of parameter estimation, the operations defined by the interface provide a mapping between the inputs and outputs of a model and the experimental data that is associated with them during estimations. For example, each object storing transient data in SPE will keep a reference to an object derived from the PortID class to do this mapping.

An example of the properties for the PortID class can be seen below:

Field Details:

Description: A description string.

Version: The version number used by subclasses to handle backward compatibility issues in conjunction with their loadobj and saveobj methods.

```
Constructor Details — the syntax to create a Matlab model object is
       h = modelpack.MLModel(@mfile, Nin, Nout, Nstates, 'param1', value1, . . . );
       h = modelpack.MLModel(@mfile, {'in1', . . . }, {'out1', . . . }, {'state1' . . . }, . . .
                             'param1', value1, . . . );
       h = modelpack.MLModel(Omfile, Nin, {'out1', . . . }, Nstates, . . . ); % Mixed
Method Details
   addParameter: Adds one or more parameters to the model.
       pId = m.addParameter('name', value);                   % One parameter by name
       pId = m.addParameter ({'name1', 'name2'}, {1.0,0.05});  % Multiple parameters
   removeParameter: Removes one or more parameters from the model.
       m.removeParameter('name;) ;                 % One parameter by name
       % Equivalent to:
       pId = m f indParameter('name') ;
       m.removeParameter(pId);
       m.removeParameter;                          % All parameters
       m.removeParameter(pId) ;                    % Specified parameters
       m.removeParameter([1 2]);                   % Multiple parameters by indices
```

Figure 6:
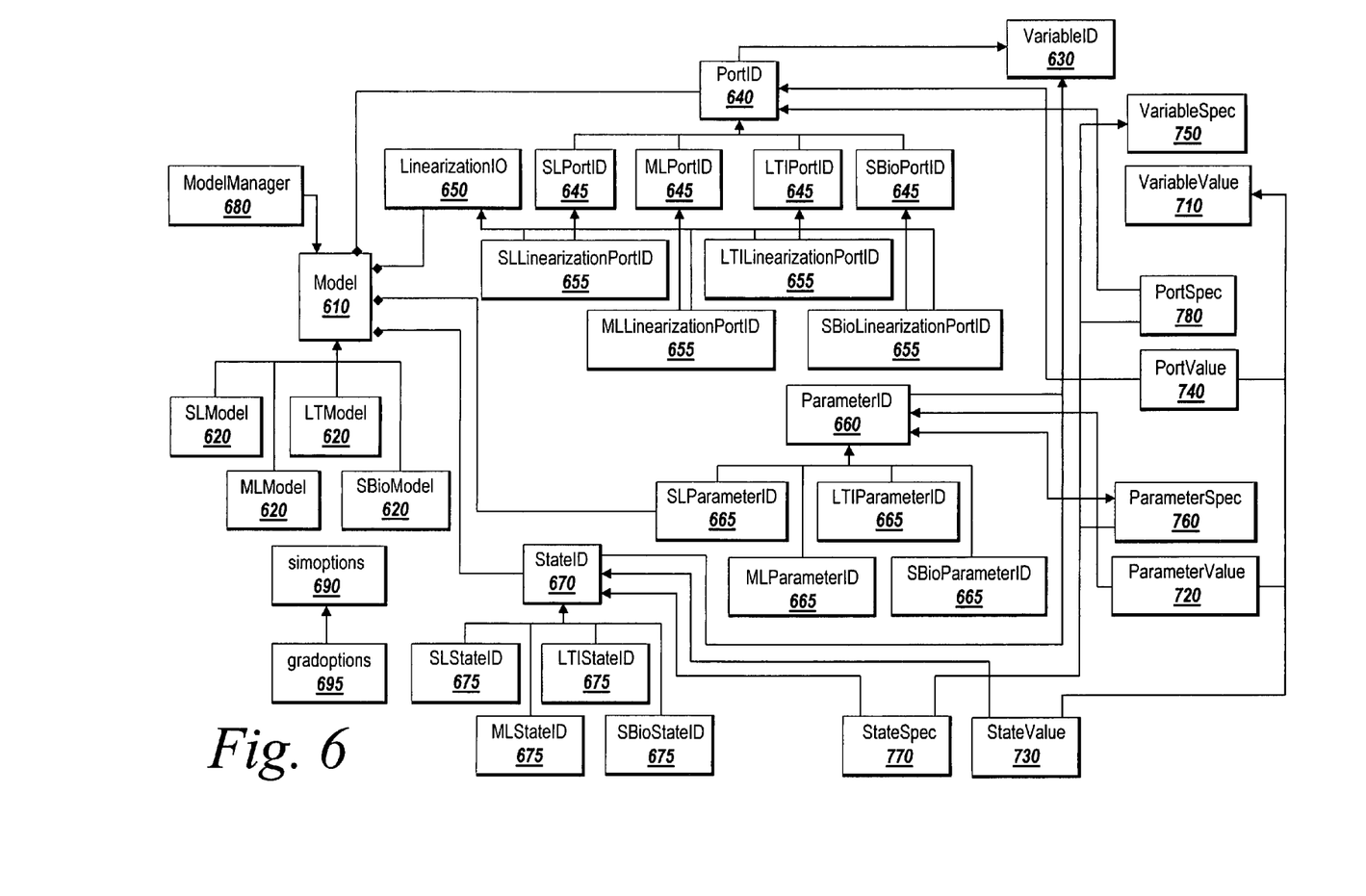
FIG. 6 is an exemplary hierarchal diagram showing the interrelation of different object classes used to implement the abstract interface.

The hierarchy of the model class 610 to other classes, including sub classes 620 such as the MLModel class, can be seen in FIG. 6. Other possible subclasses extended from the model class will be apparent to one skilled in the art given the benefit of this disclosure.

In some embodiments, the abstract interface is further implemented using an identifier object class. As with the model class, the identifier (VariableID) class can define properties that are common for representations of all model types. These include field details, constructor details, and method details.

In this example, there are three main subclasses of the identifier class. These include the port identifier class (PortID), the parameter identifier class (ParameterID), and Method Details:

getDimensions: Returns a row vector of integer numbers corresponding to the dimensions of the signal at the port.
dims=h.getDimensions;

There are three types of possible values:
(1) Return 1 for a scalar signal.
(2) Return n for a vector signal of size n.
(3) Return [m, n] for a matrix-valued signal of size [ra, n].

Note that a vector signal of size n is not the same as matrix-valued signals of size [n, 1) or [1, n].

getFullName: Returns the unique full name of the port. The full name of a port usually consists of a concatenation of its path and name; and it uniquely identifies the port in the model.
fullname=h.getFullName;

getName: Returns the name of the port.

name=h.getName;
getPath: Returns the path to the port, which is usually the full name of the (sub) system containing the port.
path=h.getPath;
get Type: Returns the port type, which is an enumerated string of type Model_IOType.
% type=='Input', 'Output'
type=h.getType;

As with the model class, the port identifier class (portID) can also be extended for specific model types. The hierarchy of the portID class 640 to the VariableID 630 and other classes can be seen in FIG. 6. Other possible subclasses 645 extended from the PortID class will be apparent to one skilled in the art given the benefit of this disclosure.

In certain embodiments a linearization I/O class is used in conjunction with the PortID classes to denote the linearization I/Os in a model. Examples of the pertinent properties are set forth below:
Method Details:
  isOpenLoop: Returns the open-loop status of the signal marked as a linearization I/O.
    flag=h.isOpenLoop;
  setOpenLoop: Sets the open-loop status of the signal marked as a linearization I/O.
    h.setOpenLoop(true);
  set Type: Sets the linearization I/O type to an enumerated string of type Model_IOType.
    % type=='Input', 'Output', 'InOut', 'OutIn'
    h.setType('InOut')

The interrelation of the Linerization I/O class 650 to subclasses 655 and other classes can be seen in FIG. 6. Other possible embodiments will be apparent to one skilled in the art given the benefit of this disclosure.

The parameter identifier class (ParameterID) defines an interface for objects representing the concept of parameters of a model. The classes derived from the ParameterID class need to implement the operations defined by the interface and are used by the Model objects to identify their parameters to interested client objects. In the context of parameter estimation, the operations defined by the interface provide a mapping between the parameters of a model and the objects working with parameter values during estimations. For example, each object representing estimated parameters in SPE will store a reference to an object derived from the ParameterID class to avoid redundant storage of parameter information.

An example of the properties for the ParameterID class can be seen below:
Field Details:
  Description: A description string.
  Version: The version number used by subclasses to handle backward compatibility issues in conjunction with their loadobj and saveobj methods.
Method Details:
  getDimensions: Returns a row vector of integer numbers corresponding to the dimensions of the parameter value.
    dims=h.getDimensions;
  getFullName: Returns the unique full name of the parameter.
    fullname=h.getFullName;
  getName: Returns the name of the parameter.
    name=h.getName;
  getPath: Returns the path to the parameter, which is usually the full name of the (sub)system in which the parameter is defined.
    path=h.getPath;
  getClass: Returns the class of the parameter value.
    type=h.getclass;
  getLocations: Returns a cell array of the full names of the objects (model, subsystems, blocks, etc.) using the parameter. If no other information is available, the string from getPath could be returned in a cell array. The location names are all relative to the model, and hence they do not include the model name.
    names=h.getLocations;

As with the port identifier class (portID), the parameter identifier class (ParameterID) can also be extended for specific model types. The hierarchy of the ParameterID class 660 to other classes can be seen in FIG. 6. Other possible subclasses 665 extended from the ParameterID class will be apparent to one skilled in the art given the benefit of this disclosure.

The state identifier class (StateID) defines an interface for objects representing the concept of states of a model. The classes derived from the StateID class need to implement the operations defined by the interface and are used by the Model objects to identify their states to interested client objects. In the context of parameter estimation, the operations defined by the interface provide a mapping between the states of a model and the objects working with state values during estimations. For example, each object representing estimated states or initial state data in SPE will store a reference to an object derived from the StateID class to do this mapping.

An example of the properties for the State ID class can be seen below:
Field Details:
  Description: A description string.
  Version: The version number used by subclasses to handle backward compatibility issues in conjunction with their loadobj and saveobj methods.
Method Details;
  getDimensions: Returns a row vector of integer numbers corresponding to the dimensions of the state value.
    dims=h.getDimensions; Note that this method call should be equivalent to calling size on the state vector.
  getFullName: Returns the unique name of the state.
    fullname=h.getFullName;
  getName: Returns the name of the state.
    name=h.getName;
  getPath: Returns the path to the state, which is usually the full name of the (sub)system in which the state is defined.
    path=h.getPath;
  getTs: Returns the sampling time of the state.
    Ts=h.getTs;

As with the port identifier class (portID), the state identifier class (StateID) can also be extended for specific model types. The hierarchy of the StateID class 670 to other classes can be seen in FIG. 6. Other possible subclasses 675 extended from the StateID class will be apparent to one skilled in the art given the benefit of this disclosure.

In some embodiments, the abstract interface is further implemented using a value object class. As with the model and identifier classes, the value class can define properties that are common for representations of all model types. These include field details, constructor details, and method details.

In this example, there are four main types of the value class. These include a variable value class, a parameter value class, a state value class, and port value class. For purposes of illustration the discussion will focus on the variable value class. The implementation of the other classes will be apparent to one skilled in the art given the benefit of this disclosure.

The variable value (VariableValue) class defines an interface to represent the concept of value of an object identified by a Variable ID object. The classes derived from the VariableValue class need to implement the operations defined by the interface and are used by the Model objects to identify values of parameters, states, and ports to interested client objects. The value objects are used to store the values of I/Os, parameters, or states resulting from estimation, tuning, or trimming the model. They can also be used to initialize model parameters and initial states. Hence, most of their properties are public since they would be modified by the users.

An example of the properties for the VariableValue class can be seen below:

---

Field Details:
    ID: The VariableID object associated with this object.
    Version: The version number used by subclasses to handle backward compatibility issues in conjunction with their loadobj and saveobj methods.
    Name: The name of the associated object.
    Value: The value of the associated object.
    Description: A description string.
Constructor Details.
The classes ParameterValue, StateValue, and PortValue implement the VariableValue interface:
h0 = modelpack.ParameterValue(m, 'path/name(expr) ');    % Name and expression
h0 = modelpack.ParameterValue(m, pId, 'expr');    % ID object
h1 = modelpack.ParameterValue(m, 'k');
% Equivalent to
p = m.findParameter('k')
h1 = modelpack.ParameterValue(m, p);
s = m.getStates(2);
h2 = modelpack.StateValue(m, s);
in = m.getInputs(3);
h3 = modelpack.PortValue(m, in);
Method Details:
    getID: Returns the identifier of type VariableID associated with this object.
        hID = h.getID;

---

The hierarchy of the variable value class 710, the parameter value class 720, the state value class 730, and port value class 740 can be seen in FIG. 6.

In some embodiments, the abstract interface is further implemented using a specification object class. As with the model and value classes, the specification class can define properties that are common for representations of all model types. These include field details, constructor details, and method details.

In this example, there are four main types of the specification class. These include a variable specification class, a parameter specification class, a state specification class, and port specification class. For purposes of illustration the discussion will focus on the variable specification class. The implementation of the other classes will be apparent to one skilled in the art given the benefit of this disclosure.

The variable specification (VariableSpec) class defines an interface to represent the concept of value specification for an object identified by a VariableID object. The specifications include the variable's range and initial value. These are used to specify information about unknown values to be computed (i.e. estimated, optimized, and trimmed). The classes derived from the VariableSpec class need to implement the operations defined by the interface and are used by the Model objects to specify values of parameters, states, and ports to interested client objects. The specification objects are used to specify I/O, parameter, or state information (ranges, initial guesses, etc) for estimation, tuning, or operating point computations. Hence, most of their properties are public since they would be modified by the users.

An example of the properties for the VariableSpec class can be seen below:
Field Details.
    ID: The VariableID object associated with this object.
    Version: The version number used by subclasses to handle backward compatibility issues in conjunction with their loadobj and saveobj methods.
    Name: The name of the associated object.
    Initial Value: The initial value of the associated object.
    Minimum: The minimum value of the associated object.
    Maximum: The maximum value of the associated object.
    Known: The optimization state of the associated object.
    TypicalValue: The typical value of the associated object.
    Description: A description string.

---

Constructor Details.
The classes ParameterSpec, StateSpec, and PortSpec implement the VariableSpec interface:
h0 = modelpack.ParameterSpec(m, 'path/name(expr) ');    % Name and expression
h0 = modelpack.ParameterSpec (m, pId, 'expr');    % ID object
h1 = modelpack.ParameterSpec (m, 'k');
% Equivalent to
p = m.findParameter('k')
h1 = modelpack.ParameterSpec (m, p);
s = m.getStates(2);
h2 = modelpack.StateSpec (m, s);
in = m.getInputs(3);
h3 = modelpack.PortSpec (m, in);
Method Details:
    getID: Returns the identifier of type VariableID associated with this object.
        hID = h.getID;

---

The hierarchy of the variable specification class 750, the parameter specification class 760, a state specification class 770, and port specification class 780 can be seen in FIG. 6.

In some embodiments, the abstract interface is further implemented using a helper object class. As with the other classes discussed above, the helper class can define properties that are common for representations of all model types. These include field details, constructor details, and method details.

In this example, there are two main types of the helper class. These include a model manager class and an options class. The implementation of the other classes will be apparent to one skilled in the art given the benefit of this disclosure.

The model manager (ModelManager) class defines a singleton object to manage various model objects to avoid duplications. Basically, each model object is a singleton for a given model name.

An example of the properties for the ModelManager class can be seen below:
Field Details:
    Models: Stores model object handles currently in use.
    ModelListeners: Stores listeners to remove the model object handles from the model list when they are deleted.
    Listeners: Internal listeners for the object's own use.
Constructor Details. The syntax to create a model manager object is:
    M=modelpack.ModelManager;
However, this constructor is not directly called by the users, but by the developers implementing Model subclasses.
Method Details: In order to guarantee that there is only one model object per model, the following code fragment should be implemented in the Model subclass constructors:
    this=modelpack.MyModelClass;
    % . . .

```
% Ask the model manager if the model exists
h=addModeK modelpack.ModelManager, this, 'name');
if (this==h)
    % New model. Initialize it.
    % ...
else
    % Model already exists.
    this=h
end
% Return 'this'
```
In this example the option class has two types: simoptions and gradoptions. The simoptions and gradoptions classes are used to specify various simulation and sensitivity computation options in conjunction with method object method calls.

An example of the properties for the simoptions class can be seen below

Field Details. The simoptions object has the following properties:

Configuration: Configuration set.

InitialState: An array of State Value objects.

Outputs: An array of Port ID objects indicatings the outputs for which the responses are desired.

Description: A description string.

Version: The version number used by subclasses to handle backward compatibility issues in conjunction with their loadobj and saveobj methods.

Constructor Details. The syntax to create options objects are:
h=modelpack.simoptions(m);

The gradoptions class is a subclass of the simoptions class. As such is has the same base properties as simoptions plus the following:

Field Details.

GradientType: The gradient computation accuracy, which is an enumerated string

Perurbation: Minimum and maximum perturbation sizes used in sensitivity computations.

Constructor Details:
h=modelpack.gradoptions(m);

The hierarchy of the ModelManagaer class 680, the simoptions class 690, and gradoptions class 695 can be seen in FIG. 6.

Refering now back to FIG. 4, the second step of the method is making a call to the dynamic model via methods specified in the abstract interface. The call may be any of methods supported by the object classes set forth above. Using the abstract interface, calls can be used to query the model about its properties such as its inputs, parameters, etc.; simulate the model and gather its response; obtain various model jacobians; and trim and linearize the model.

An example of calls and operations performed for an M-file model can be seen below:

```
% Create model object
model=modelpack.MLModel(@msd_model_ode, 1, 2, 4, ...
    'm', [1 2], 'k', [100 200], 'b', [10 20]);
% or
model=modelpack.MLModel(@msd_model_ode,    {'F'},
    {'d1', 'd2'}, ...
    {'Pos 1', 'Vel 1', 'Pos 2', 'Vel 2'}, ...
    'm', [1 2], 'k', [100 200], 'b', [10 20]);
% Set initial values
s=model.getStates;
model.setValues(s, {1 0 1 0});
% Simulate
ts1=model.simulate(time, force);
% Compute sensitivity
ts2=model.getSensitivity(time, force, 'k');
% Operating points
op_point=model.findOperatingPoint(1.0);
% Linearizon
pin=model.getInputs;
pOut=model.getOutputs;
model.addLinearizationIO([pIn pOut])
G=model.linearize(op.point);
step(G);
```

In this example a model object was created and initial values were set. Then the model was simulated, sensitivity was computed, and operating points determined. Then the model was linearized.

Figure 7:
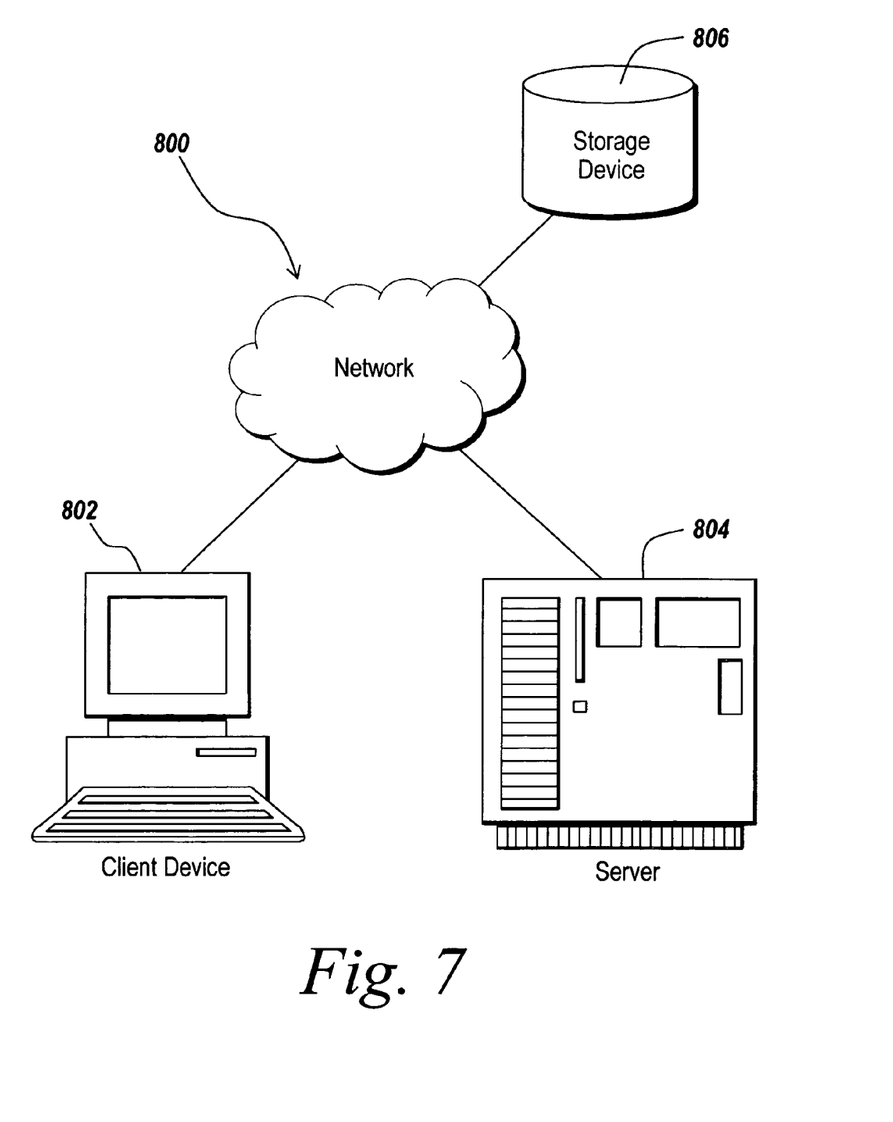
FIG. 7 illustrates a client-server environment suitable for practicing an illustrative embodiment of the present invention.

The examples to this point have focused primarily on the system where the graphical modeling environment was on a local computing device. The graphical modeling environment may, of course, also be implemented on a network 800, as illustrated in FIG. 7, having a server 804 and a client device 802. Other devices, such as a storage device 806, may also be connected to the network.

In one such embodiment a system for generating and displaying a graphical modeling application, comprises a distribution server for providing to a client device, intrinsic units of measure for modeling physical systems; and a client device in communication with the distribution server. Here the distribution server provides a client device, such as a computing device discussed above, an abstract interface for interfacing a model. The abstract interface is compatible with a plurality of model types. The abstract interface may be an API. The client may then use the abstract interface to access a dynamic model of a system.

In another embodiment, the server may execute the modeling environment. A user may then interact with the modeling environment on the server through the client device. In one example of such a system, a server and client device are provided. The server is capable of executing a modeling environment. The client device is in communication with the server over a network. An abstract interface is provided for interfacing a model. The abstract interface is compatible with a plurality of model types. The server receives from the client device, a call to a dynamic model using the abstract interface. The client device then receives data from the dynamic model from the server in response to the call.

It will be understood by one skilled in the art that these network embodiments are exemplary and that the functionality may be divided up in any number of ways over a network.

The proceeding examples have focused primarily on models of physical systems but it will be apparent to one skilled in the art that there are numerous other domains, systems, fields and applications the present invention would be suitable. Some examples include but are not limited to, models in the electrical, biological, and chemical domains.

The present invention has been described relative to illustrative embodiments. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

What is claimed is:

1. In a modeling environment, a method comprising:
   providing an abstract interface where the abstract interface:
   is compatible with a plurality of dynamic model types, wherein the plurality of dynamic model types comprise two or more model types selected from the group consisting of a model type that is compatible with a Simulink model, a type of model represented using one or more ordinary differential equations (ODEs), a linear time invariant (LTI) model type, and a model type that is compatible with a SimBiology model, is implemented using a model object class that defines properties that are common for objects of the model class and further defines how the abstract interface communicates with one or more dynamic models that are respectively one of the plurality of dynamic model types, is further implemented using an identifier object class for representing ports, parameters and states of a model as objects, and facilitates the modeling environment communicating with a dynamic model that is a model type not supported by the modeling environment;

making a single call from the modeling environment to the dynamic model via a method specified in the abstract interface;

receiving data in the modeling environment from the dynamic model in response to the single call; and performing an operation in the modeling environment using the data received in response to the single call, the operation performing at least one of an editing operation, simulation or analysis of the model.

2. The method of claim 1 wherein the abstract interface is an application programming interface (API).

3. The method of claim 1 wherein a subclass for a specific model type is extended from the model class.

4. The method of claim 1 wherein a subclass for a specific model type is extended from the identifier object class.

5. The method of claim 1 wherein the abstract interface is further implemented using a value object class for objects representing values of variables, parameters, states and ports of a model.

6. The method of claim 1 wherein the abstract interface is further implemented using a specification object class for objects representing specifications of variables, parameters, states and ports of a model.

7. The method of claim 1 wherein the abstract interface is further implemented using a helper object class.

8. The method of claim 1 wherein the single call to the dynamic model is made by a toolbox for the modeling environment.

9. The method of claim 1 wherein the dynamic model is a textual model.

10. The method of claim 1 wherein the dynamic model is a graphical model.

11. The method of claim 1 wherein the dynamic model is a compiled model generated from code.

12. The method of claim 1 wherein the single call to the dynamic model includes a simulation request.

13. The method of claim 1 wherein the single call to the dynamic model includes a linearization request.

14. A non-transitory computer-readable medium holding instructions executable by a computing device, the instructions when executed causing at least one computing device to:

provide an abstract interface where the abstract interface:

is compatible with a plurality of dynamic model types, wherein the plurality of dynamic model types comprise two or more model types selected from the group consisting of a model type that is compatible with a Simulink model, a type of model represented using one or more ordinary differential equations (ODEs), a linear time invariant (LTI) model type, and a model type that is compatible with a SimBiology model, is implemented using a model object class that defines properties that are common for objects of the model class and further defines how the abstract interface communicates with one or more dynamic models that are respectively one of the plurality of dynamic model types is further implemented using an identifier object class for representing ports, parameters and states of a model as objects, and facilitates a modeling environment communicating with a dynamic model that is a model type not supported by the modeling environment;

make a call from the modeling environment to the dynamic model via a method specified in the abstract interface;

receiving data in the modeling environment from the dynamic model in response to the call; and performing an operation in the modeling environment using the data received in response to the call, the operation performing at least one of an editing operation, simulation or analysis of the model.

15. The non-transitory computer-readable medium of claim 14 wherein the abstract interface is an application programming interface (API).

16. The non-transitory computer-readable medium of claim 14 wherein a subclass for a specific model type is extended from the model object class.

17. The non-transitory computer-readable medium of claim 14 wherein a subclass for a specific model type is extended from the identifier object class.

18. The non-transitory computer-readable of claim 14 wherein the abstract interface is further implemented using a value object class for objects representing values of variables, parameters, states and ports of a model.

19. The non-transitory computer-readable medium of claim 14 wherein the abstract interface is further implemented using a specification object class for objects representing specifications of variables, parameters, states and ports of a model.

20. The non-transitory computer-readable medium of claim 14 wherein the abstract interface is further implemented using a helper object class.

21. The medium of claim 14 wherein the call to the dynamic model is made by a toolbox for the modeling environment.

22. The non-transitory computer-readable medium of claim 14 wherein the dynamic model is a textual model.

23. The non-transitory computer-readable medium of claim 14 wherein the dynamic model is a graphical model.

24. The non-transitory computer-readable medium of claim 14 wherein the dynamic model is a compiled model generated from code.

25. The non-transitory computer-readable medium of claim 14 wherein the call to the dynamic model is a simulation request.

26. The non-transitory computer-readable medium of claim 14 wherein the call to the dynamic model is a linearization request.

27. A system for generating and displaying a physical modeling application, comprising:

a user-operable input device for inputting data to the physical modeling application;

a display device for displaying a physical model; and a computing device including memory for storing computer program instructions and data, and at least one processor for:

providing an abstract interface where the abstract interface:
is compatible with a plurality of dynamic model types, wherein the plurality of dynamic model types comprise two or more model types selected from the group consisting of a model type that is compatible with a Simulink model, a type of model represented using one or more ordinary differential equations (ODEs), a linear time invariant (LTI) model type, and a model type that is compatible with a SimBiology model,
is implemented using a model object class that defines properties that are common for objects of the model object class and further defines how the abstract interface communicates with one or more dynamic models that are respectively one of the plurality of dynamic model types,
is further implemented using an identifier object class for representing ports, parameters and states of a model as objects, and
facilitates a modeling environment communicating with a dynamic model that is a model type not supported by the modeling environment;
making a call from the modeling environment to the dynamic model via a method specified in the abstract interface;
receiving data in the modeling environment from the dynamic model in response to the call; and
performing an operation in the modeling environment using the data received in response to the call, the operation performing at least one of an editing operation, simulation or analysis of the model.

28. The system of claim 27, wherein the at least one processor of the computing device is a multiple core processor.

29. The system of claim 27, wherein the computing device has multiple processors.

30. A system for executing a modeling application, comprising:
client device in communication with a distribution server to access an abstract interface where the abstract interface:
is compatible with a plurality of dynamic model types, wherein the plurality of dynamic model types comprise two or more model types selected from the group consisting of a model type that is compatible with a Simulink model, a type of model represented using one or more ordinary differential equations (ODEs), a linear time invariant (LTI) model type, and a model type that is compatible with a SimBiology model,
is implemented using a model object class that defines properties that are common for objects of the model object class and further defines how the abstract interface communicates with one or more dynamic models that are respectively one of the plurality of dynamic model types,
is further implemented using an identifier object class for representing ports, parameters and states of a model as objects, and
facilitates a modeling environment communicating with a dynamic model that is a model type not supported by the modeling environment, the client device including:
at least one processor for:
making a call from the modeling environment to the dynamic model via a method specified in the abstract interface, and
receiving data in the modeling environment from the dynamic model in response to the call; and
a memory for storing the data, the data used to perform an operation in the modeling environment toolbox using the data, the operation performing at least one of an editing operation, simulation or analysis of the model.

31. In a network having a server, executing a physical modeling environment, a method for communicating with the server comprising:
providing, at the server, a dynamic model of a system;
providing an abstract interface where the abstract interface:
is compatible with a plurality of dynamic model types, wherein the plurality of dynamic model types comprise two or more model types selected from the group consisting of a model type that is compatible with a Simulink model, a type of model represented using one or more ordinary differential equations (ODEs), a linear time invariant (LTI) model type, and a model type that is compatible with a SimBiology model,
is implemented using a model object class that defines properties that are common for objects of the model object class and further defines how the abstract interface communicates with one or more dynamic models that are respectively one of the plurality of dynamic model types,
is further implemented using an identifier object class for representing ports, parameters and states of a model as objects, and
facilitates a modeling environment communicating with a dynamic model that is a model type not supported by the modeling environment;
receiving, at the server from a client device, a single call from the modeling environment to the dynamic model;
receiving data in the modeling environment from the dynamic model in response to the single call; and
performing an operation in the modeling environment using the data received in response to the single call, the operation performing at least one of an editing operation, simulation or analysis of the model.

* * * * *